US012579961B2

(12) United States Patent
Kandpal et al.

(10) Patent No.: US 12,579,961 B2
(45) Date of Patent: Mar. 17, 2026

(54) MUSIC ENHANCEMENT SYSTEMS

(71) Applicant: Adobe Inc., San Jose, CA (US)

(72) Inventors: Nikhil Kandpal, Carrboro, NC (US); Oriol Nieto-Caballero, Oakland, CA (US); Zeyu Jin, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 783 days.

(21) Appl. No.: 17/726,289

(22) Filed: Apr. 21, 2022

(65) Prior Publication Data

US 2023/0343312 A1 Oct. 26, 2023

(51) Int. Cl.
*G10H 1/00* (2006.01)
*G10H 1/06* (2006.01)

(52) U.S. Cl.
CPC ............. *G10H 1/0008* (2013.01); *G10H 1/06* (2013.01); *G10H 2210/066* (2013.01); *G10H 2250/005* (2013.01)

(58) Field of Classification Search
CPC .. G10H 1/0008; G10H 1/06; G10H 2210/066; G10H 2250/005
USPC .......................................................... 84/609
See application file for complete search history.

(56) References Cited

U.S. PATENT DOCUMENTS 10,511,908 B1 * 12/2019 Fisher .................... G06N 3/047
2023/0230609 A1 * 7/2023 Seetharaman ...... G10L 21/0232 704/232

OTHER PUBLICATIONS

Jonathan Ho et al., “Denoising Diffusion Probabilistic Models,” (https://arxiv.org/pdf/2006.11239.pdf, arXiv:2006.11239v2, published Dec. 16, 2020, retrieved Feb. 6, 2025) (Year: 2020).*
Chen et al. (“WaveGrad: Estimating Gradients for Waveform Generation),” https://arxiv.org/abs/2009.00713, Oct. 9, 2020.*
Mehri et al. , SampleRNN: An Unconditional End-To-End Neural Audio Generation Model, Feb. 11, 2017, pp. 1-11.*
Chen, Nanxin , et al., “WaveGrad: Estimating Gradients for Waveform Generation”, Cornell University arXiv, arXiv.org [retrieved Feb. 24, 2022]. Retrieved from the Internet <https://arxiv.org/pdf/2009.00713.pdf>., Oct. 9, 2020, 15 Pages.

(Continued)

*Primary Examiner* — Jeffrey Donels
*Assistant Examiner* — Philip G Scoles
(74) *Attorney, Agent, or Firm* — FIG. 1 Patents

(57) ABSTRACT

In implementations of music enhancement systems, a computing device implements an enhancement system to receive input data describing a recorded acoustic waveform of a musical instrument. The recorded acoustic waveform is represented as an input mel spectrogram. The enhancement system generates an enhanced mel spectrogram by processing the input mel spectrogram using a first machine learning model trained on a first type of training data to generate enhanced mel spectrograms based on input mel spectrograms. An acoustic waveform of the musical instrument is generated by processing the enhanced mel spectrogram using a second machine learning model trained on a second type of training data to generate acoustic waveforms based on mel spectrograms. The acoustic waveform of the musical instrument does not include an acoustic artifact that is included in the recorded waveform of the musical instrument.

20 Claims, 9 Drawing Sheets

(56) References Cited

OTHER PUBLICATIONS

Defossez, Alexandre , et al., “Real Time Speech Enhancement in the Waveform Domain”, Cornell University arXiv, arXiv.org [retrieved Feb. 24, 2022]. Retrieved from the Internet <https://arxiv.org/pdf/2006.12847.pdf>., Sep. 6, 2020, 5 Pages.
Défossez, Alexandre , et al., “Music Source Separation in the Waveform Domain”, Cornell University arXiv, arXiv.org [retrieved Feb. 24, 2022]. Retrieved from the Internet <https://arxiv.org/pdf/1911.13254.pdf>., Apr. 28, 2021, 16 Pages.
Duan, Zhiyao , et al., “Speech Enhancement by Online Non-negative Spectrogram Decomposition in Non-stationary Noise Environments”, Interspeech [retrieved Feb. 24, 2022]. Retrieved from the Internet <http://www2.ece.rochester.edu/~zduan/resource/DuanMysoreSmaragdis_IS12.pdf>., 2012, 4 pages.
Eaton, J. , et al., “The ACE challenge—Corpus description and performance evaluation”, IEEE Workshop on Applications of Signal Processing to Audio and Acoustics (WASPAA) [retrieved Feb. 24, 2022]. Retrieved from the Internet <https://spiral.imperial.ac.uk/bitstream/10044/1/28499/2/Eaton122015.pdf>., Oct. 2015, 5 Pages.
Griffin, Daniel , et al., “Signal estimation from modified short-time Fourier transform”, IEEE Transactions on Acoustics, Speech, and Signal Processing vol. 32, No. 2 [retrieved Feb. 24, 2022]. Retrieved from the Internet <https://doi.org/10.1109/TASSP.1984.1164317>., Apr. 1984, 8 Pages.
Han, Kun , et al., “Learning Spectral Mapping for Speech Dereverberation and Denoising”, IEEE/ACM Transactions on Audio, Speech, and Language Processing vol. 23, No. 6 [retrieved Feb. 24, 2022]. Retrieved from the Internet <http://web.cse.ohio-state.edu/~wang.77/papers/HWWWMZ.taslp15.pdf>., Jun. 1, 2015, 11 Pages.
He, Kaiming , et al., “Deep Residual Learning for Image Recognition”, arXiv Preprint, arXiv.org [retrieved Feb. 24, 2022]. Retrieved from the Internet <https://arxiv.org/pdf/1512.03385.pdf>., Dec. 10, 2015, 12 pages.
Hennequin, Romain , et al., “Spleeter: a fast and efficient music source separation tool with pre-trained models”, Journal of Open Source Software, vol. 5, No. 50 [retrieved Feb. 24, 2022]. Retrieved from the Internet <https://pdfs.semanticscholar.org/58a9/c96d86befc6f1e0de88b198a8a282f7773c9.pdf>., Jun. 2020, 4 Pages.
Ho, Jonathan , et al., “Denoising Diffusion Probabilistic Models”, Cornell University arXiv, arXiv.org [retrieved Feb. 24, 2022]. Retrieved from the Internet <https://arxiv.org/pdf/2006.11239.pdf>., Dec. 16, 2020, 25 Pages.
Hu, Yi , et al., “Evaluation of Objective Quality Measures for Speech Enhancement”, Audio, Speech, and Language Processing, IEEE Transactions on, vol. 16, No. 1 [retrieved Feb. 24, 2022]. Retrieved from the Internet <https://ecs.utdallas.edu/loizou/speech/obj_paper_jan08.pdf>., 2008, 10 Pages.
Isola, Phillip , et al., “Image-to-Image Translation with Conditional Adversarial Networks”, 2017 IEEE Conference on Computer Vision and Pattern Recognition (CVPR) [retrieved Feb. 24, 2022]. Retrieved from the Internet <https://gangw.web.illinois.edu/class/cs598/papers/CVPR17-img2img.pdf>., Nov. 22, 2017, 17 pages.
Kagami, Hideaki , et al., “Joint Separation and Dereverberation of Reverberant Mixtures with Determined Multichannel Non-Negative Matrix Factorization”, IEEE International Conference on Acoustics, Speech and Signal Processing (ICASSP) [retrieved Feb. 24, 2022]. Retrieved from the Internet <http://www.kecl.ntt.co.jp/people/kameoka.hirokazu/publications/Kagami2018ICASSP04_published.pdf>., 2018, 5 Pages.
Kandpal, Nikhil , et al., “Music Enhancement via Image Translation and Vocoding”, GitHub, Inc., [retrieved Feb. 24, 2022]. Retrieved from the Internet <https://nkandpa2.github.io/music-enhancement/>., 2 Pages.
Kilgour, Kevin , et al., “Fréchet Audio Distance: A Metric for Evaluating Music Enhancement Algorithms”, Cornell University arXiv, arXiv.org [retrieved Feb. 24, 2022]. Retrieved from the Internet <https://arxiv.org/pdf/1812.08466.pdf>., Jan. 17, 2019, 20 Pages.
Kong, Zhifeng , et al., “DiffWave: A Versatile Diffusion Model for Audio Synthesis”, Cornell University arXiv, arXiv.org [retrieved Feb. 24, 2022]. Retrieved from the Internet <https://arxiv.org/pdf/2009.09761.pdf>., Mar. 30, 2021, 17 Pages.
Kumar, Kundan , et al., “MelGAN: Generative Adversarial Networks for Conditional Waveform Synthesis”, NIPS’19: Proceedings of the 33rd International Conference on Neural Information Processing Systems [retrieved Feb. 24, 2022]. Retrieved from the Internet <https://proceedings.neurips.cc/paper/2019/file/6804c9bca0a615bdb9374d00a9fcba59-Paper.pdf>., Jun. 15, 2021, 12 Pages.
Lostanlen, Vincent , et al., “Deep convolutional networks on the pitch spiral for musical instrument recognition”, Cornell University arXiv, arXiv.org [retrieved Feb. 24, 2022]. Retrieved from the Internet <https://arxiv.org/pdf/1605.06644.pdf>., Jan. 10, 2017, 7 Pages.
Luo, Yi , et al., “Conv-TasNet: Surpassing Ideal Time-Frequency Magnitude Masking for Speech Separation”, IEEE/ACM Transactions on Audio, Speech, and Language Processing vol. 27, No. 8 [retrieved Feb. 24, 2022]. Retrieved from the Internet <https://ieeexplore.ieee.org/ielaam/6570655/8716764/8707065-aam.pdf>., May 6, 2019, 12 Pages.
Manocha, Pranay , et al., “CDPAM: Contrastive learning for perceptual audio similarity”, Cornell University arXiv, arXiv.org [retrieved Feb. 24, 2022]. Retrieved from the Internet <https://arxiv.org/pdf/2102.05109.pdf>., Feb. 9, 2021, 5 Pages.
Mehri, Soroush , et al., “SampleRNN: An Unconditional End-to-End Neural Audio Generation Model”, Cornell University arXiv, arXiv.org [retrieved Feb. 24, 2022]. Retrieved from the Internet <https://arxiv.org/pdf/1612.07837.pdf>., Feb. 11, 2017, 11 Pages.
Michelsanti, Daniel , et al., “Conditional Generative Adversarial Networks for Speech Enhancement and Noise-Robust Speaker Verification”, Cornell University arXiv, arXiv.org [retrieved Feb. 24, 2022]. Retrieved from the Internet <https://arxiv.org/pdf/1709.01703.pdf>., Sep. 7, 2017, 5 Pages.
Pascual, Santiago , et al., “SEGAN: Speech Enhancement Generative Adversarial Network”, Cornell University arXiv, arXiv.org [retrieved Feb. 24, 2022]. Retrieved from the Internet <https://arxiv.org/pdf/1703.09452.pdf>., Jun. 9, 2017, 5 Pages.
Pascual, Santiago , et al., “Towards Generalized Speech Enhancement with Generative Adversarial Networks”, Cornell University arXiv, arXiv.org [retrieved Feb. 24, 2022]. Retrieved from the Internet <https://arxiv.org/pdf/1904.03418.pdf>., Apr. 6, 2019, 5 Pages.
Polyak, Adam , et al., “High Fidelity Speech Regeneration with Application to Speech Enhancement”, Cornell University arXiv, arXiv.org [retrieved Feb. 24, 2022]. Retrieved from the Internet <https://arxiv.org/pdf/2102.00429.pdf>., Jan. 31, 2021, 5 Pages.
Reddy, Chandan K A K A, et al., “DNSMOS: A Non-Intrusive Perceptual Objective Speech Quality metric to evaluate Noise Suppressors”, Cornell University arXiv, arXiv.org [retrieved Feb. 24, 2022]. Retrieved from the Internet <https://arxiv.org/pdf/2010.15258.pdf>., Feb. 10, 2021, 5 Pages.
Reddy, Chandan KA, et al., “Interspeech 2021 Deep Noise Suppression Challenge”, Cornell University arXiv, arXiv.org [retrieved Feb. 24, 2022]. Retrieved from the Internet <https://arxiv.org/pdf/2101.01902.pdf>., Apr. 5, 2021, 5 Pages.
Scalart, Pascal , et al., “Speech Enhancement Based on a Priori Signal to Noise Estimation”, Conference Proceedings of 1996 IEEE International Conference on Acoustics, Speech, and Signal Processing; vol. 2 [retrieved Feb. 24, 2022]. Retrieved from the Internet <https://cairn.enssat.fr/bindocs/publications/SCALART_96-1.pdf>., May 7, 1996, 4 Pages.
Su, Jiaqi , et al., “Bandwidth Extension is All You Need”, IEEE International Conference on Acoustics, Speech and Signal Processing (ICASSP) [retrieved Feb. 24, 2022]. Retrieved from the Internet <https://pixl.cs.princeton.edu/pubs/Su_2021_BEI/ICASSP2021_Su_Wang_BWE.pdf>., 2021, 5 Pages.
Su, Jiaqi , et al., “HiFi-GAN: High-Fidelity Denoising and Dereverberation Based on Speech Deep Features in Adversarial Networks”, Cornell University arXiv, arXiv.org [retrieved Feb. 24, 2022]. Retrieved from the Internet <https://arxiv.org/pdf/2006.05694.pdf>., Sep. 21, 2020, 5 Pages.

(56) References Cited

OTHER PUBLICATIONS

Su, Jiaqi , et al., "HiFi-GAN-2: Studio-Quality Speech Enhancement via Generative Adversarial Networks Conditioned on Acoustic Features", IEEE Workshop on Applications of Signal Processing to Audio and Acoustics (WASPAA) [retrieved Feb. 24, 2022]. Retrieved from the Internet <https://gfx.cs.princeton.edu/pubs/Su_2021_HSS/Su-HiFi-GAN-2-WASPAA-2021.pdf>., 2021, 5 Pages.

Ulyanov, Dmitry , et al., "Instance Normalization: The Missing Ingredient for Fast Stylization", Cornell University arXiv, arXiv.org [retrieved Feb. 24, 2022]. Retrieved from the Internet <https://arxiv.org/pdf/1607.08022.pdf>., Nov. 6, 2017, 6 pages.

Van Den Oord, Aaron , et al., "Wavenet: A Generative Model for Raw Audio", Cornell University arXiv, arXiv.org [retrieved Feb. 24, 2022]. Retrieved from the Internet <https://arxiv.org/pdf/1609.03499.pdf>., Sep. 19, 2016, 15 pages.

Williamson, Donald S, et al., "Speech dereverberation and denoising using complex ratio masks", IEEE International Conference on Acoustics, Speech and Signal Processing (ICASSP) [retrieved Feb. 24, 2022]. Retrieved from the Internet <http://web.cse.ohio-state.edu/~wang.77/papers/Williamson-Wang.icassp17.pdf>., 2017, 5 Pages.

Yamamoto, Ryuichi , et al., "Parallel Wavegan: A Fast Waveform Generation Model Based on Generative Adversarial Networks with Multi-Resolution Spectrogram", Cornell University arXiv, arXiv.org [retrieved Feb. 24, 2022]. Retrieved from the Internet <https://arxiv.org/pdf/1910.11480.pdf>., Feb. 6, 2020, 5 Pages.

You, Jaeseong , et al., "GAN Vocoder: Multi-Resolution Discriminator Is All You Need", Cornell University arXiv, arXiv.org [retrieved Feb. 24, 2022]. Retrieved from the Internet <https://arxiv.org/pdf/2103.05236.pdf>., Aug. 23, 2021, 5 Pages.

* cited by examiner

MUSIC ENHANCEMENT SYSTEMS

BACKGROUND

A significant amount of music content is created and recorded in non-treated environments using low-quality microphones. As a result of this, the recorded music is often of a low acoustic quality and includes background noise, unpleasant reverberation, resonance caused by the low-quality microphones and the non-treated environments, and so forth. Conventional techniques for improving the acoustic quality of the recorded music such as mixing and mastering typically involve at least some level of human intervention (e.g., by a music engineer).

Conventional systems for automatically improving an acoustic quality of recorded music are generally limited to performing a particular modification to a waveform of the recorded music to achieve a specific result such as applying a filter or a preset to the recorded waveform. Automatically improving the acoustic quality of the recorded music by modifying the recorded waveform is challenging because the recorded music is typically polyphonic and variables which contribute to the low acoustic quality of the recorded music are unknown, potentially numerous, and difficult to generalize. Because of these challenges, conventional systems are only capable of automatically making minor or incremental improvements in the acoustic quality of recorded music which is a shortcoming of the conventional systems.

SUMMARY

Techniques and systems for music enhancement are described. In an example, a computing device implements an enhancement system to receive input data describing a recorded acoustic waveform of a musical instrument. The recorded acoustic waveform is of a low acoustic quality and includes noise, reverberations, microphone-induced resonance, etc. For example, the enhancement system represents the recorded acoustic waveform of the musical instrument as an input mel spectrogram which can be interpreted as a digital image.

An enhanced mel spectrogram is generated by processing the input mel spectrogram using a first machine learning model trained on a first type of training data to generate enhanced mel spectrograms based on input mel spectrograms. In one example, the enhancement system generates an acoustic waveform of the musical instrument by processing the enhanced mel spectrogram using a second machine learning model trained on a second type of training data to generate acoustic waveforms based on mel spectrograms. The acoustic waveform of the musical instrument does not include an acoustic artifact that is included in the recorded acoustic waveform of the musical instrument.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
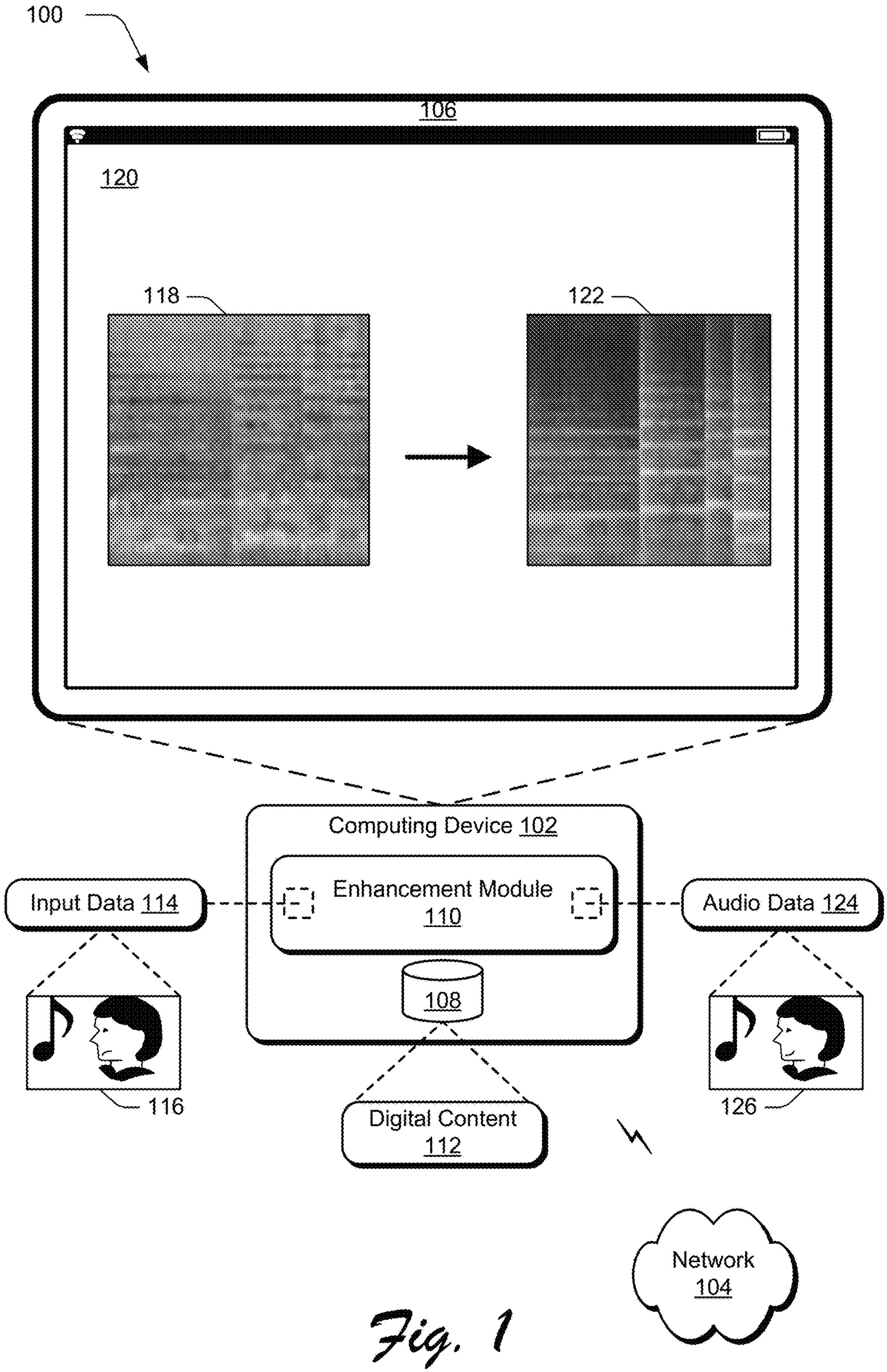
FIG. 1 is an illustration of an environment in an example implementation that is operable to employ digital systems and techniques for music enhancement as described herein.

Conventional systems for automatically improving an acoustic quality of recorded music do so by modifying a waveform of the recorded music such as by applying a filter or a preset to the recorded waveform. Automatically improving the acoustic quality of the recorded music by modifying the recorded waveform is challenging because the recorded music is polyphonic and variables which contribute to the low acoustic quality are unknown, potentially numerous, and difficult to generalize. Due to these issues, conventional systems that modify recorded waveforms are only capable of automatically making minor or incremental improvements in an acoustic quality of recorded music which is a shortcoming of the conventional systems.

In order to overcome the limitations of conventional systems, techniques and systems for music enhancement are described. In one example, a computing device implements an enhancement system to receive input data describing a recorded acoustic waveform of a musical instrument. In this example, the acoustic waveform of the musical instrument is recorded in non-treated environment using a low-quality microphone. As a result, the recorded acoustic waveform is of a low acoustic quality and includes noise, unpleasant reverberations, and resonance caused by the low-quality microphone and the non-treated environment.

The enhancement system represents the recorded acoustic waveform of the musical instrument as an input mel spectrogram. The input mel spectrogram is a representation of a frequency of the recorded acoustic waveform in the mel scale which is a scale of pitches that human hearing generally perceives to be equidistant from each other. For instance, the input mel spectrogram is also usable as a digital image that is capable of being processed using machine learning models.

For example, the enhancement system generates an enhanced mel spectrogram by processing the input mel spectrogram using a first machine learning model trained on a first type of training data to generate enhanced mel spectrograms based on input mel spectrograms. In one example, the first machine learning model is a conditional generative adversarial network. The enhancement system generates an acoustic waveform of the musical instrument by processing the enhanced mel spectrogram using a second machine learning model trained on a second type of training data to generate acoustic waveforms based on mel spectrograms. In some examples, the second machine learning model is a denoising diffusion probabilistic model.

The acoustic waveform of the musical instrument has an improved acoustic quality relative to the low-quality recorded acoustic waveform. For example, the acoustic waveform does not include an acoustic artifact that is included in the recorded acoustic waveform. In another example, the acoustic waveform includes an additional acoustic artifact that is not included in the recorded acoustic waveform of the musical instrument.

By generating the acoustic waveform of the musical instrument in this way, the enhancement system is capable of improving an acoustic quality for recorded waveforms of a single musical instrument or multiple musical instruments. Unlike conventional systems that attempt to modify recorded waveforms, the described systems generate acoustic waveforms that significantly improve an acoustic quality of recorded music automatically and without user intervention which is not possible using the conventional systems. These technological improvements are validated in a mean opinion score test with human listeners in which the described systems outperform a conventional system by improving the acoustic quality of low-quality recorded music to achieve a mean opinion score nearly matching a mean opinion score for high-quality music recorded in professional recording studio.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 which is connected to a network 104 in one example. In another example, the computing device 102 is not connected to the network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and an enhancement module 110. The storage device 108 is illustrated to include digital content 112 such as digital music, digital images, digital videos, etc.

The enhancement module 110 is illustrated as having, receiving, and/or transmitting input data 114 that describes a recorded acoustic waveform of a musical instrument or multiple musical instruments. For example, the recorded acoustic waveform is recorded in a non-treated environment. As a result of this, the recorded acoustic waveform is of low acoustic quality and includes background noise, unpleasant reverberations, resonance caused by a microphone and the non-treated environment, and so forth. The low acoustic quality of the recorded acoustic waveform is indicated by a representation 116 which illustrates a user listening to the recorded acoustic waveform of the musical instrument (or multiple musical instruments) described by the input data 114 and frowning because it is unpleasant to listen to the recorded acoustic waveform due to its low acoustic quality.

In order to enhance the acoustic quality of the recorded acoustic waveform, the enhancement module 110 processes the input data 114 and represents the recorded acoustic waveform of the musical instrument (or musical instruments) as an input mel spectrogram 118 which is displayed in a user interface 120 of the display device 106. As shown, the input mel spectrogram 118 represents a frequency of the recorded acoustic waveform in the mel scale which is a scale of pitches that human hearing generally perceives to be equidistant from each other. In particular, the mel scale is a logarithmic transformation of the frequency of the recorded acoustic waveform.

Since the input mel spectrogram 118 is also a digital image, it is possible for the enhancement module 110 to process the input mel spectrogram 118 using machine learning models. For instance, the enhancement module 110 processes the input mel spectrogram 118 using a first machine learning model trained on a first type of training data to generate enhanced mel spectrograms based on input mel spectrograms. In one example, the first machine learning model is a conditional generative adversarial network that includes a generator and a discriminator. In this example, the first type of training data is generated from pairs of recorded acoustic waveforms that are recorded in a treated environment (e.g., a recording studio) and perturbed acoustic waveforms. For example, the perturbed acoustic waveforms are generated by perturbing the recorded acoustic waveforms. Accordingly, the recorded acoustic waveforms have a high acoustic quality and the corresponding perturbed acoustic waveforms have a low acoustic quality that is simulated by modifying the high-quality recorded acoustic waveforms.

The enhancement module 110 represents the pairs of high-quality recorded acoustic waveforms and low-quality perturbed acoustic waveforms as pairs of high-quality mel spectrograms and low-quality mel spectrograms to generate the first type of training data. For example, the enhancement module 110 trains the first machine learning model using the pairs of high and low quality mel spectrograms. As part of this training, the generator generates high-quality mel spectrograms based on the low quality mel spectrograms with an objective of maximizing the discriminator's loss and minimizing a distance between the generated high-quality mel spectrograms and the corresponding high-quality mel spectrograms which are treated as ground truth mel spectrograms in the first type of training data. The enhancement module 110 trains the discriminator to classify whether a given mel spectrogram is generated by the generator or is a ground truth mel spectrogram. The discriminator performs this classification on a patch-wise basis, predicting a class for each patch in the given mel spectrogram. For example, the discriminator acts as a learned loss function and the generator enforces realistic local features and global consistency with the ground truth mel spectrogram.

The enhancement module 110 processes the input mel spectrogram 118 using the trained first machine learning model to generate an enhanced mel spectrogram 122 which is also displayed in the user interface. As shown, the enhanced mel spectrogram 122 represents the low quality recorded acoustic waveform that is represented by the input mel spectrogram 118 as an acoustic waveform of having an improved acoustic quality. For instance, the enhanced mel spectrogram 122 is a mel scale representation of an acoustic waveform without acoustic artifacts that are included in the low quality recorded acoustic waveform of the musical instrument or instruments. As illustrated in the user interface 120, the input mel spectrogram 118 appears noisy and disjointed due to the acoustic artifacts that are included the low quality recorded acoustic waveform. However, the enhanced mel spectrogram 122 appears relatively smooth and more coherent than the input mel spectrogram 118 because the enhanced mel spectrogram 122 is a mel scale representation of a high-quality acoustic waveform.

For example, the enhancement module 110 processes the enhanced mel spectrogram 122 using a second machine learning model trained on a second type of training data to generate acoustic waveforms based on mel spectrograms. In an example, the second machine learning model is a denoising diffusion probabilistic model that iteratively adds Gaussian noise to acoustic waveforms included in the second type of training data. In this example, the second machine learning model is trained on the second type of training data to estimate reverse transition distributions for each noising step conditioned on mel spectrograms of high-quality acoustic waveforms included in the second type of training data.

For instance, the enhancement module 110 processes the enhanced mel spectrogram 122 using the trained second machine learning model to generate audio data 124. The audio data 124 describes a high-quality acoustic waveform of the musical instrument (or musical instruments). The high-quality of the acoustic waveform described by the audio data 124 is indicated by a representation 126 which illustrates the user listening to the high-quality acoustic waveform of the musical instrument and smiling because it is pleasant to listen to the acoustic waveform due to its high acoustic quality. By generating the enhanced mel spectrogram 122 using the trained first machine learning model and generating the audio data 124 describing the high-quality acoustic waveform of the musical instrument using the trained second machine learning model, the enhancement module 110 is capable generating a high-quality waveform of music based on a low-quality recorded waveform of the music automatically and without user intervention.

Figure 2:
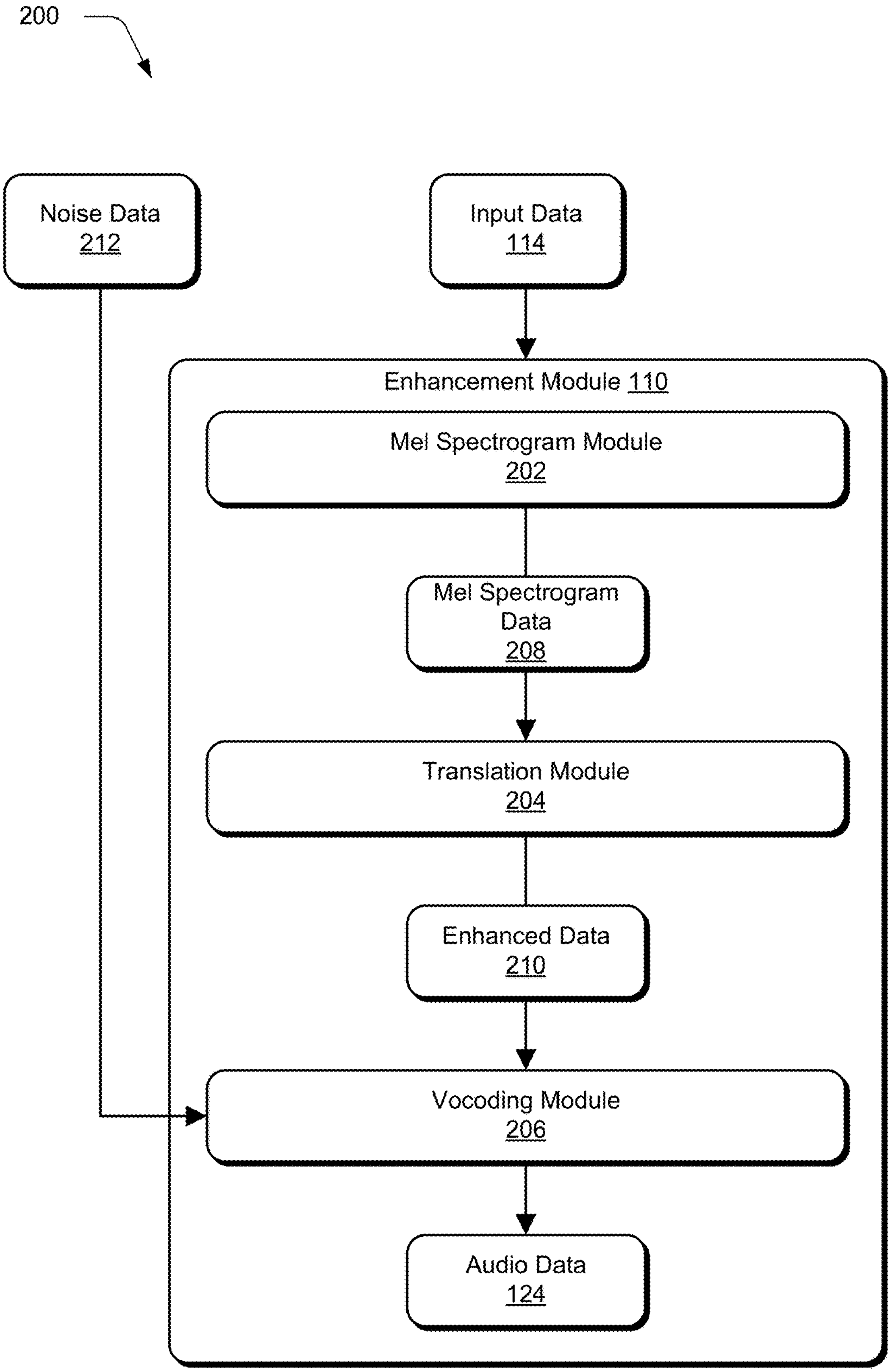
FIG. 2 depicts a system in an example implementation showing operation of an enhancement module for enhancing music.

FIG. 2 depicts a system 200 in an example implementation showing operation of an enhancement module 110. The enhancement module 110 is illustrated to include a mel spectrogram module 202, a translation module 204, and a vocoding module 206. For instance, the mel spectrogram module 202 receives the input data 114 describing a recorded waveform of a musical instrument having low acoustic quality. In one example, the low-quality recorded waveform of the musical instrument is recorded in a non-treated environment. As a result, the recorded waveform described by the input data 114 includes background noise, unpleasant reverberations, resonance caused by a microphone used to record the waveform in the non-treated environment, etc. As shown in FIG. 2, the mel spectrogram module 202 receives and processes the input data 114 to generate mel spectrogram data 208.

Figure 3A:
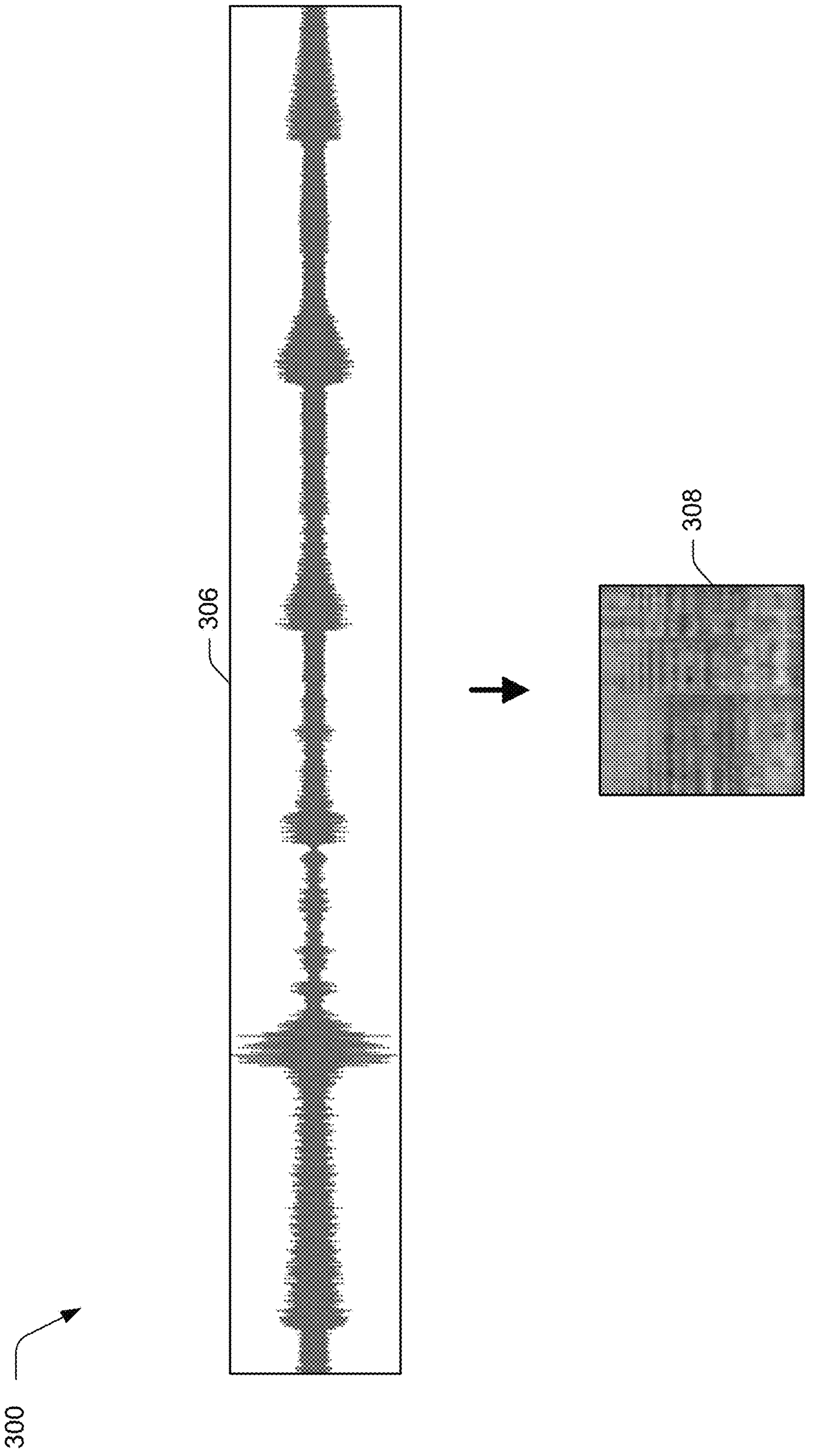
FIGS. 3A, 3B, and 3C illustrate an example of receiving input data describing a recorded acoustic waveform of a musical instrument and generating an acoustic waveform of the musical instrument that does not include an acoustic artifact that is included in the recorded acoustic waveform.
Figure 3B:
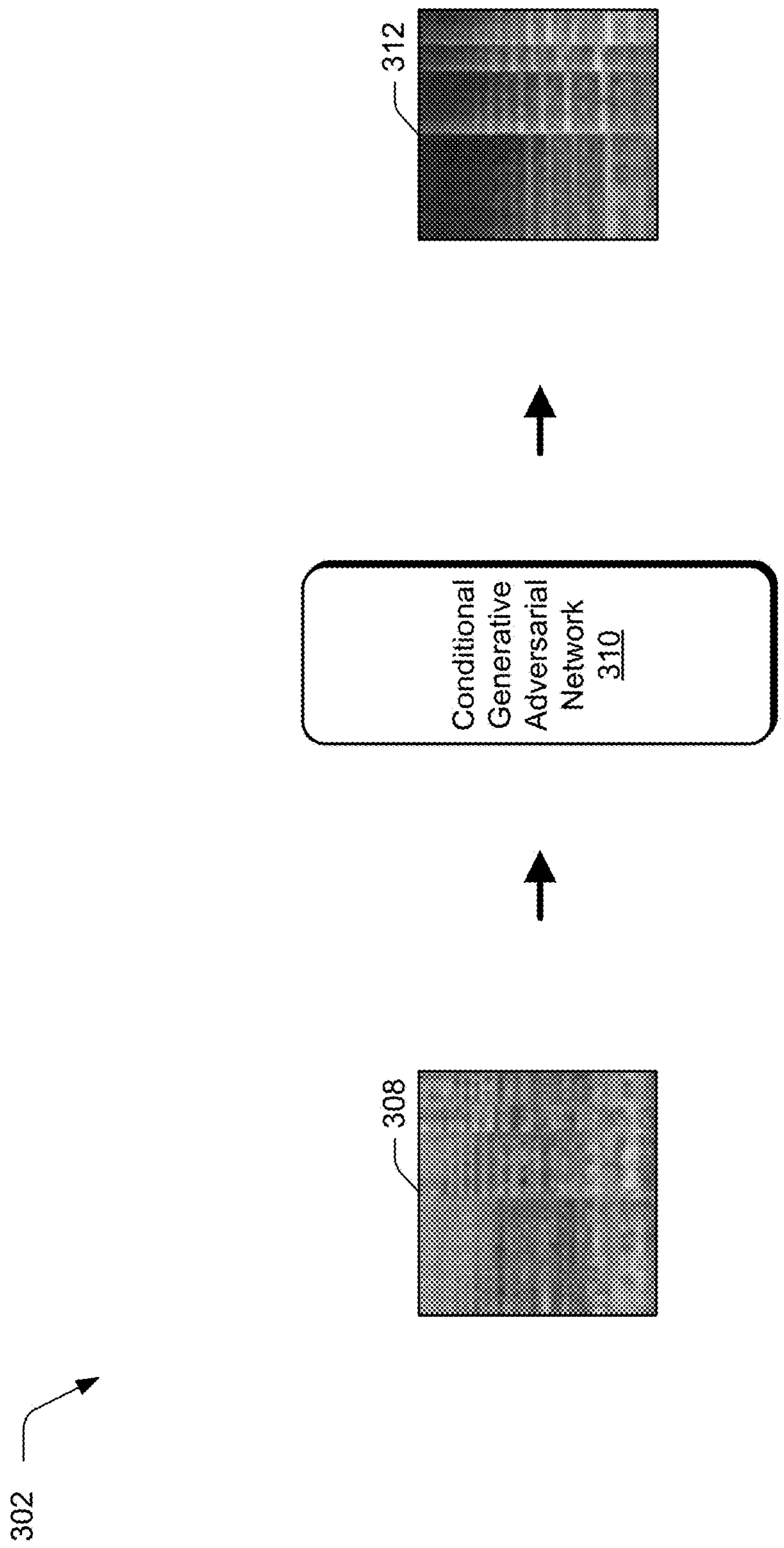
Figure 3C:
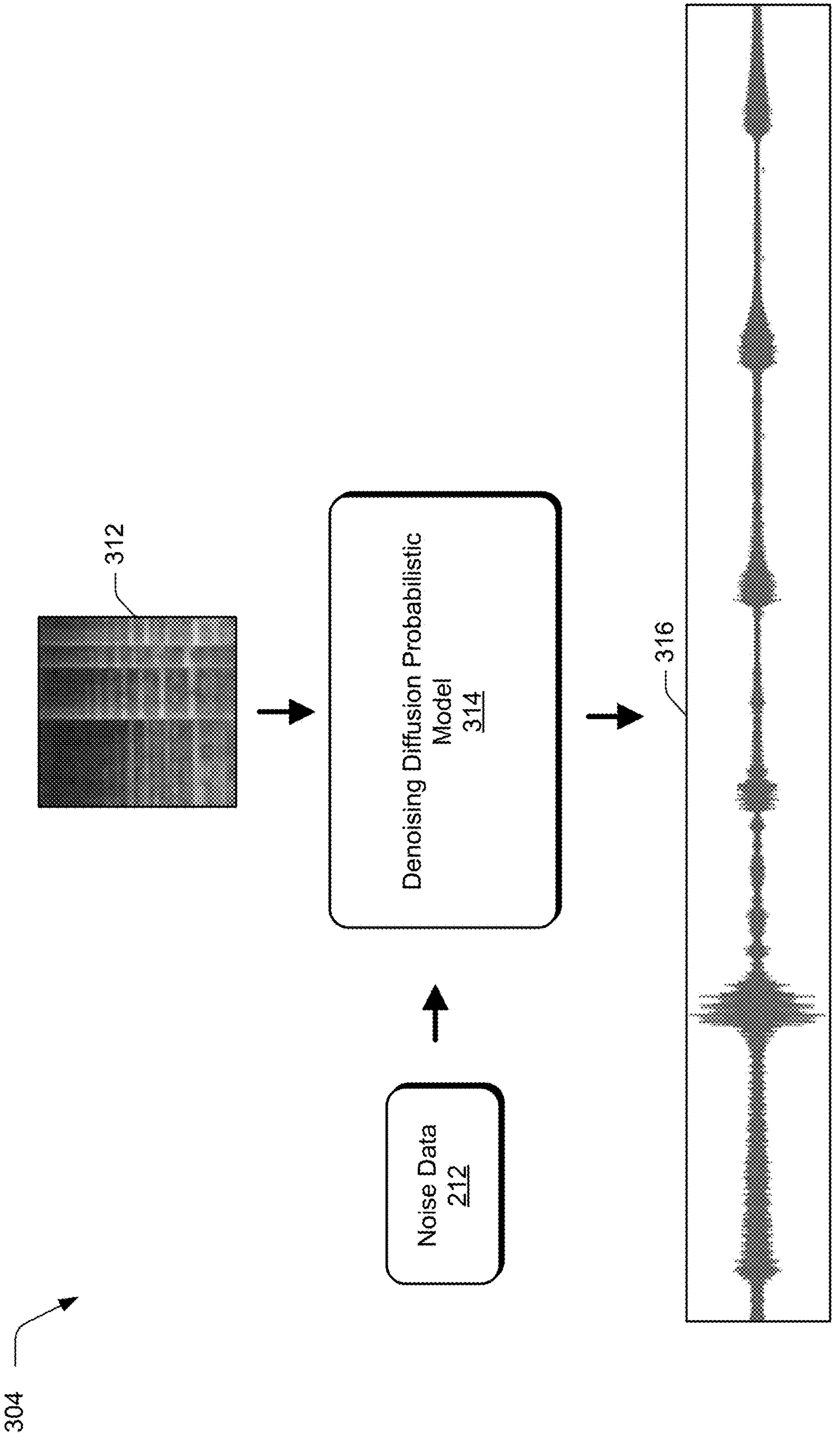

FIGS. 3A, 3B, and 3C illustrate an example of receiving input data describing a recorded acoustic waveform of a musical instrument and generating an acoustic waveform of the musical instrument that does not include an acoustic artifact that is included in the recorded acoustic waveform. FIG. 3A illustrates a representation 300 of generation of the mel spectrogram data 208. FIG. 3B illustrates a representation 302 of generating an enhanced mel spectrogram using a first machine learning model. FIG. 3C illustrates a representation 304 of generating an acoustic waveform of the musical instrument using a second machine learning model which does not include an acoustic artifact that is included in the recorded acoustic waveform of the musical instrument described by the input data 114.

As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

With reference to FIG. 2 and FIG. 3A, the input data 114 describes a recorded a recorded acoustic waveform 306 of music made by a musical instrument or multiple musical instruments. For example, the recorded acoustic waveform 306 is a recording of a piano being played in a non-treated environment which is recorded using an inexpensive microphone that is not intended for recording music. As a result, the recorded acoustic waveform 306 is of low acoustic quality which is apparent from a shape of the waveform. Large clusters of spikes in the recorded acoustic waveform 306 correspond to sounds made when keys of the piano are pressed causing hammers to strike strings of the piano which vibrate to make the sounds. Smaller clusters of spikes the recorded acoustic waveform 306 correspond to background noise or reverberations from the non-treated environment. For instance, it is unpleasant to listen to the recorded acoustic waveform 306 because of its low acoustic quality.

In one example, the mel spectrogram module 202 represents the recorded acoustic waveform 306 of the piano as an input mel spectrogram 308. The input mel spectrogram 308 represents the recorded acoustic waveform 306 in the mel scale which is a logarithmic transformation of a frequency of the recorded acoustic waveform 306 based on a scale of pitches generally perceivable by human hearing as being equidistant from each other. In an example, the mel spectrogram module 202 computes the input mel spectrogram with 128 mel bins, a Fast Fourier Transform size of 1024, and a 256 sample hop length. For example, the mel spectrogram module 202 generates the mel spectrogram data 208 as describing the input mel spectrogram 308.

The translation module 204 receives the mel spectrogram data 208 and processes the mel spectrogram data 208 using the first machine learning model trained on a first type of training data to generate enhanced mel spectrograms. For example, the translation module 204 processes the mel spectrogram data 208 to generate enhanced data 210. With reference to FIG. 3B, the translation module 204 includes the first machine learning model. In one example, the first machine learning model is a conditional generative adversarial network 310 which includes a generator and a discriminator. For example, the conditional generative adversarial network 310 is a network as described by Isola et al., *Image-to-Image Translation with Conditional Adversarial Networks*, arXiv:1611.07004v3 [cs.CV] (26 Nov. 2018) in an approach similar to Michelsanti et al., *Conditional Generative Adversarial Networks for Speech Enhancement and Noise-Robust Speaker Verification*, arXiv:1709.01703v2 [eess.AS] (7 Sep. 2017).

In an example, the first type of training data includes pairs of high-quality mel spectrograms and corresponding low quality mel spectrograms. Each of the mel spectrogram pairs is computed from a corresponding pair of a high-quality recorded acoustic waveform and a low-quality acoustic waveform. The high-quality recorded acoustic waveforms are from a Medley-solos-DB dataset which contains 21,572 three-second duration samples of single musical instruments recorded in professional recording studios. The translation module 204 uses 5841 samples for training, 3494 samples for validation, and the rest of the samples for testing.

For example, the corresponding low-quality acoustic waveforms are generated by modifying the high-quality recorded acoustic waveforms. To generate a particular low-quality acoustic waveform from a particular high-quality recorded acoustic waveform, the translation module 204 first convolves the particular high-quality recorded acoustic waveform with a room impulse response to simulate reverberations and varied microphone placements of non-professional recording equipment. Next, the translation module 204 applies additive background noise scaled to achieve a randomly sampled signal-to-noise ratio between 5 and 30 dB. Finally, the translation module 204 generates the low-quality acoustic waveform by simulating a low-quality microphone frequency response. To do so, the translation module 204 applies multi-band equalization (e.g., 4-band equalization) with randomly sampled gains between −15 and 15 dB and frequency bands from 0-200 Hz, 200-1000 Hz, 1000-4000 Hz, and 4000-8000 Hz.

As a final step to generate pairs of high-quality recorded acoustic waveforms and corresponding low-quality acoustic waveforms, the translation module 204 applies a low-cut filter to remove inaudible low frequencies below 35 Hz and normalizes the waveforms to have a maximum absolute value of 0.95. The translation module 204 computes the pairs of high-quality mel spectrograms and corresponding low quality mel spectrograms from the pairs of high-quality recorded acoustic waveforms and corresponding low-quality acoustic waveforms. For instance, the translation module 204 computes mel spectrogram pairs with 128 mel bins, a Fast Fourier Transform size of 1024, and a 256 sample hop length. In one example, the mel spectrogram pairs included in the first type of training data use log-scale amplitudes to reduce a range of values and avoid positive restrictions of the domain or range of the first machine learning model.

For example, the generator of the conditional generative adversarial network 310 includes two downsampling blocks that each contain a two-dimensional convolutional kernel of size 3 and stride 2. This is followed by 3 ResNet blocks with kernel size 3 and instance normalization. Finally, a representation is upsampled back to its original dimensionality with two upsampling blocks each containing a transposed convolutional kernel of size 3 and stride 2, instance normalization, and ReLU activation functions. In an example, the discriminator of the conditional generative adversarial network 310 is a fully convolutional model of three blocks that each contain a convolutional kernel of size 4 and stride 2, instance normalization, and LeakyReLU activation functions. In this example, the last layer does not have normalization or an activation function.

The translation module 204 trains both the generator and the discriminator of the conditional generative adversarial network 310 using the first type of training data with a batch size of 64 and a learning rate of 0.0002 for 200 epochs. The generator is trained with L1 loss between generated mel spectrograms and the high-quality mel spectrograms included in the first type of training data which are taken as ground truth mel spectrograms, and generator loss is back-propagated from the discriminator. The discriminator is trained with least square generative adversarial network loss to classify whether a given mel spectrogram is generated by the generator or is included in the true training dataset. For example, the discriminator performs the classification on a patch-wise basis, predicting a class for each patch in the given mel spectrogram. Because of this, the discriminator acts as a learned loss function for the generator which enforces realistic local features and the L1 loss enforces global consistency with the ground truth mel spectrograms.

Once the first machine learning model is trained on the first type of training data, the translation module 204 processes the mel spectrogram data 208 using the trained first machine learning model to generate an enhanced mel spectrogram 312. For instance, the enhanced mel spectrogram 312 represents the low-quality the recorded acoustic waveform 306 of the piano having improved acoustic quality. In one example, the enhanced mel spectrogram 312 is representative of an acoustic waveform of the piano which does not include an acoustic artifact that is included in the recorded acoustic waveform 306. In this example, the acoustic artifact is noise, a reverberation, a particular frequency energy, and so forth. In some examples, the enhanced mel spectrogram 312 is representative of an acoustic waveform of the piano which includes an additional acoustic artifact that is not included in the recorded acoustic waveform 306 and the additional acoustic artifact improves an acoustic quality of the acoustic waveform of the piano relative to the recorded acoustic waveform 306 of the piano.

The translation module 204 generates the enhanced data 210 as describing the enhanced mel spectrogram 312. As shown in FIG. 2, the vocoding module 206 receives the enhanced data 210 and noise data 212. For example, the noise data 212 describes Gaussian noise. In one example, the vocoding module 206 processes the enhanced data 210 and the noise data 212 using the second machine learning model trained on a second type of training data to generate acoustic waveforms based on mel spectrograms. In this example, the vocoding module 206 processes the enhanced data 210 and the noise data 212 to generate audio data 214.

With reference to FIG. 3C, the vocoding module 206 includes the second machine learning model which is a denoising diffusion probabilistic model 314 in some examples. For example, the second machine learning model is a model as described by Kong et al., *DIFFWAVE: a Versatile Diffusion Model for Audio Synthesis*, arXiv:

2009.09761v3 [eess.AS] (20 Mar. 2021). In an example, the vocoding module 206 generates the second type of training data by adding the Gaussian noise described by the noise data 212 to the high-quality recorded acoustic waveforms from the Medley-solos-DB dataset. The second type of training data also includes mel spectrograms computed for the high-quality recorded acoustic waveforms from the Medley-solos-DB dataset.

The vocoding module 206 trains the denoising diffusion probabilistic model 314 on the second type of training data to estimate a reverse transition distribution of each noising step from adding the Gaussian noise to the high-quality recorded acoustic waveforms from the Medley-solos-DB dataset conditioned on the mel spectrograms computed for the high-quality recorded acoustic waveforms. In one example, the vocoding module 206 trains the denoising diffusion probabilistic model 314 on the second type of training data for 3000 epochs using a batch size of 8 and a learning rate of 0.0002. For example, sampling from the second machine learning model includes sampling noise from a standard Gaussian distribution and iteratively denoising using the reverse transition distributions.

The vocoding module 206 processes the enhanced data 210 and the noise data 212 using the trained second machine learning model to generate an acoustic waveform 316 of the piano. As shown, the acoustic waveform 316 of the piano has improved acoustic quality relative to the recorded acoustic waveform 306. For example, the acoustic waveform 316 does not include acoustic artifacts that are included in the recorded acoustic waveform 306. The acoustic waveform 316 does not included the background noise or reverberations from the non-treated environment that are included in the recorded acoustic waveform 306. Instead, the acoustic waveform 316 sounds as if it was recorded in a professional recording studio. Unlike the recorded acoustic waveform 306 which is unpleasant to hear, it is pleasant to listen to the acoustic waveform 316. For instance, the vocoding module 206 generates the audio data 124 as describing the acoustic waveform 316 of the piano.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 4:
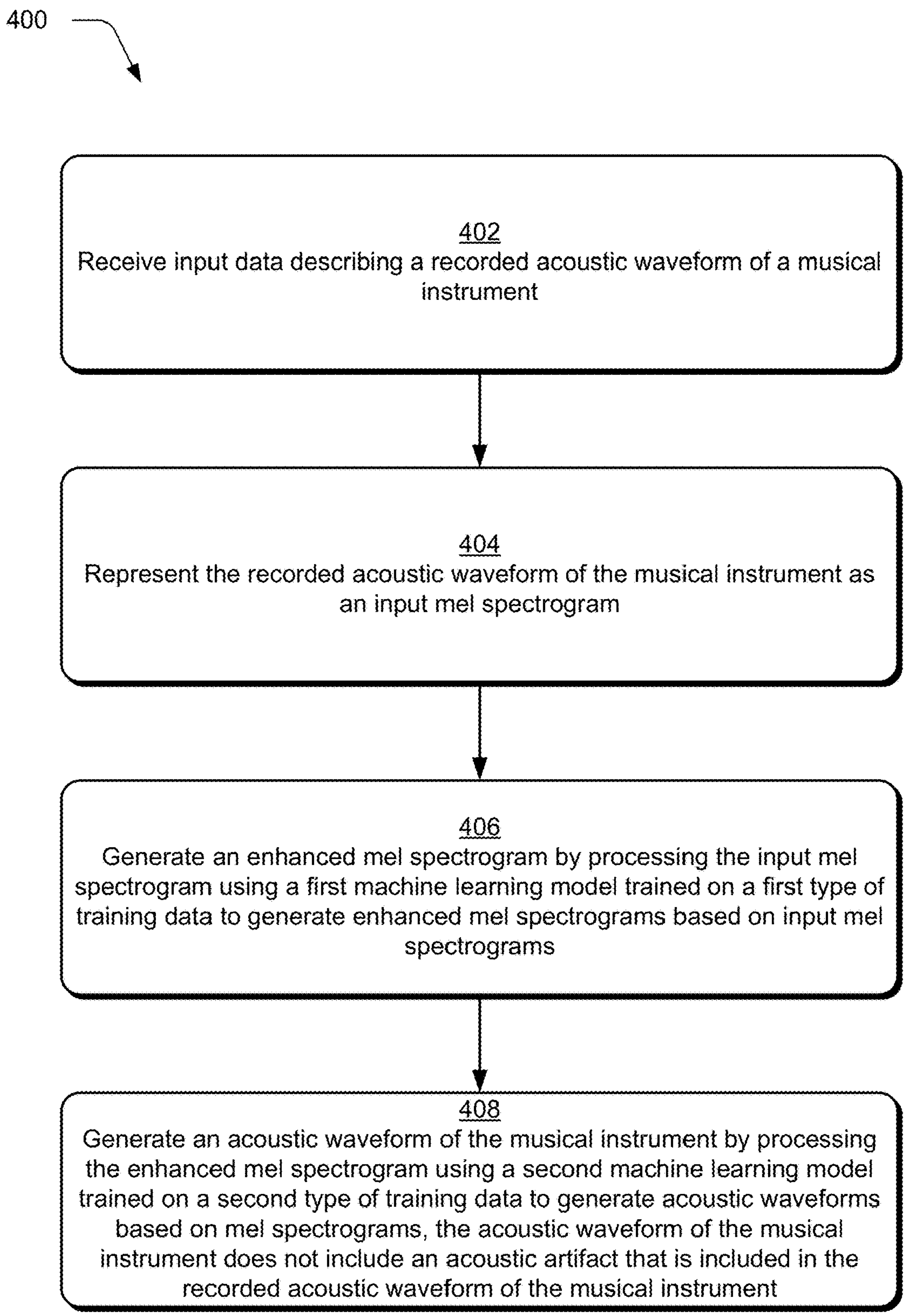
FIG. 4 is a flow diagram depicting a procedure in an example implementation in which input data describing a recorded acoustic waveform of a musical instrument is received and an acoustic waveform of the musical instrument that does not include an acoustic artifact that is included in the recorded acoustic waveform is generated.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3. FIG. 4 is a flow diagram depicting a procedure 400 in an example implementation in which input data describing a recorded acoustic waveform of a musical instrument is received and an acoustic waveform of the musical instrument that does not include an acoustic artifact that is included in the recorded acoustic waveform is generated.

Input data is received describing a recorded acoustic waveform of a musical instrument (block 402). The computing device 102 implements the enhancement module 110 to receive the input data in some examples. The recorded acoustic waveform of the musical instrument is represented as an input mel spectrogram (block 404). For example, the enhancement module 110 represents the recorded acoustic waveform as the input mel spectrogram.

An enhanced mel spectrogram is generated by processing the input mel spectrogram using a first machine learning model trained on a first type of training data to generate enhanced mel spectrograms based on input mel spectrograms (block 406). In an example, the enhancement module 110 generates the enhanced mel spectrogram using the first machine learning model. An acoustic waveform of the musical instrument is generated by processing the enhanced mel spectrogram using a second machine learning model trained on a second type of training data to generate acoustic waveforms based on mel spectrograms (block 408), the acoustic waveform of the musical instrument does not include an acoustic artifact that is included in the recorded acoustic waveform of the musical instrument. In one example, the enhancement module 110 generates the acoustic waveform of the musical instrument using the second machine learning model.

Figure 5A:
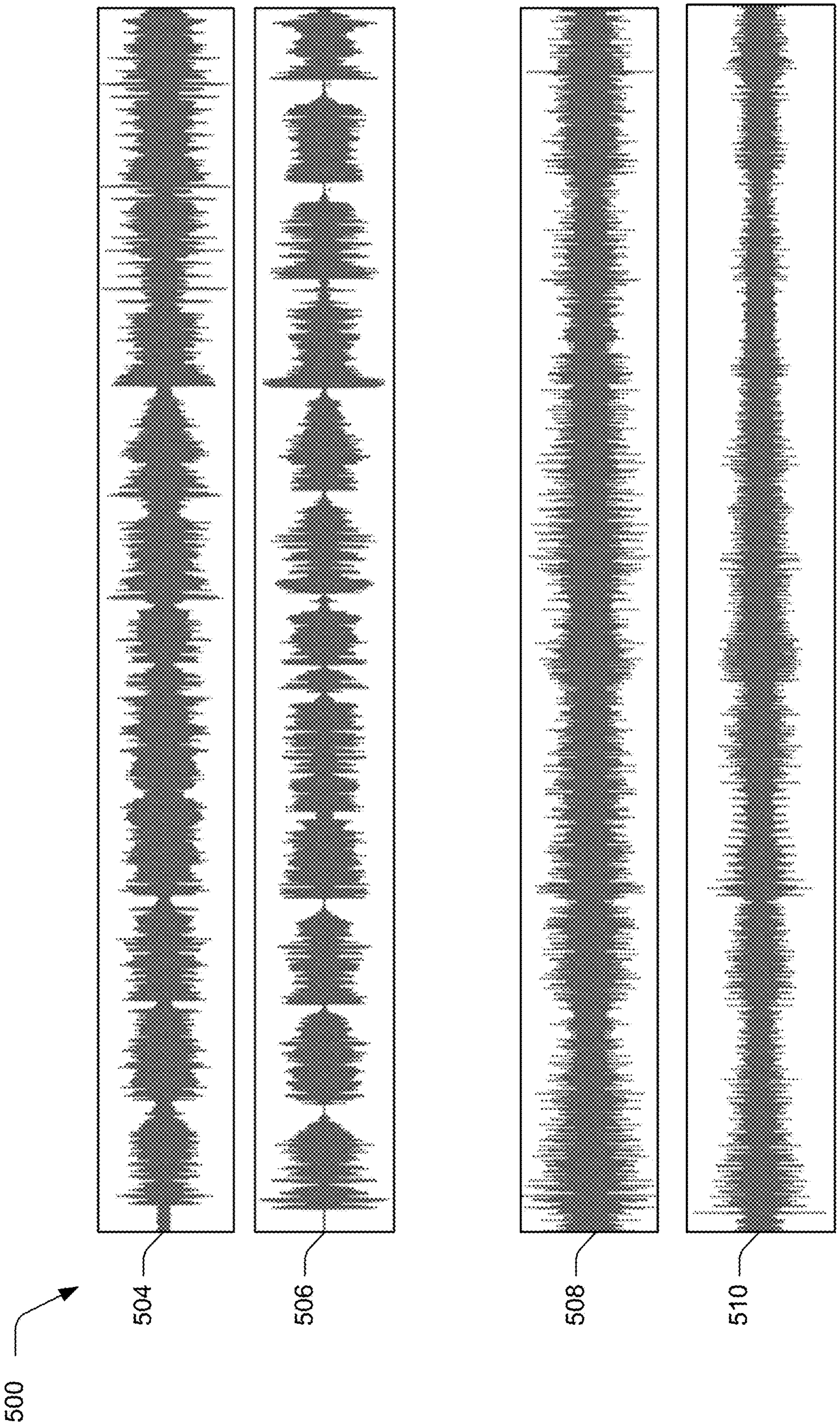
FIGS. 5A and 5B illustrate representations of inputs which are low-quality recorded acoustic waveforms of musical instruments and outputs which are generated high-quality acoustic waveforms of the musical instruments.
Figure 5B:
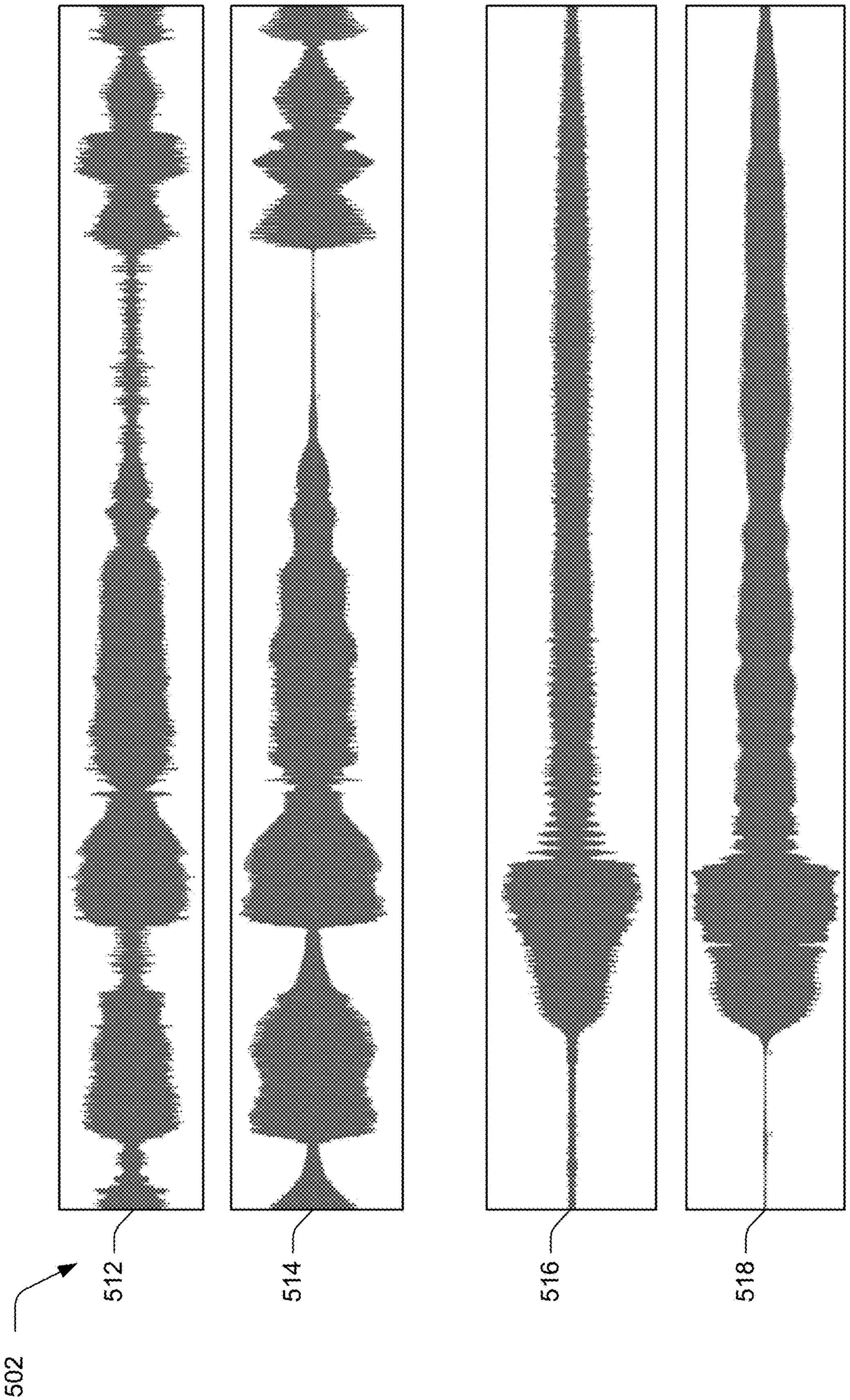

FIGS. 5A and 5B illustrate representations of inputs which are low-quality recorded acoustic waveforms of musical instruments and outputs which are generated high-quality acoustic waveforms of the musical instruments. FIG. 5A illustrates a representation 500 of generated waveforms for a first trumpet and a first piano and for a second piano. FIG. 5B illustrates a representation 502 of generated waveforms for a second trumpet and for a clarinet.

As shown in FIG. 5A, the representation 500 includes a recorded acoustic waveform 504 for the first trumpet and the first piano. The recorded acoustic waveform 504 is of low acoustic quality and unpleasant to hear. The enhancement module 110 processes the recorded acoustic waveform 504 to generate an acoustic waveform 506 for the first trumpet and the first piano which is of high acoustic quality and pleasant to hear. The representation 500 also includes a recorded acoustic waveform 508 of the second piano which was recorded in a non-treated environment. The enhancement module 110 processes the recorded acoustic waveform 508 to generate an acoustic waveform 510 for the second piano. The acoustic waveform 510 sounds as if it was recorded in a professional recording studio.

With reference to FIG. 5B, the representation 502 includes a recorded acoustic waveform 512 for the second trumpet which is of low acoustic quality and includes undesirable acoustic artifacts. For example, the enhancement module 110 generates an acoustic waveform 514 of the second trumpet by processing the recorded acoustic waveform 512. The acoustic waveform 514 is of high acoustic quality and does not include the undesirable acoustic artifacts that are included in the recorded acoustic waveform 512. The representation 502 also includes a recorded acoustic waveform 516 of the clarinet which is of low acoustic quality and is unpleasant to hear. The enhancement module 110 processes the recorded acoustic waveform 516 to generate an acoustic waveform 518 for the clarinet. As shown, the acoustic waveform 518 includes an additional acoustic artifact that is not included in the recorded acoustic waveform 516. For example, the additional acoustic artifact causes the acoustic waveform 518 to be of high acoustic quality and pleasant to hear.

Example Improvements

The described systems for music enhancement were evaluated relative to conventional systems for enhancing speech because no conventional systems for music enhancement could be identified other than the conventional systems that modify recorded waveforms. The evaluation included 200 samples from the test set with added simulations in 8 different settings. These samples were processed using the described systems for music enhancement and the conventional systems for enhancing speech. Outputs along with the simulated noisy samples and clean ground truth samples were presented to human listeners who are required to provide a quality score from 1 to 5 (e.g., an opinion score). Original clean recordings were used as high anchors and the same recordings with 0 dB white noise were used as low anchors. After passing a screening test, the human listeners completed 34 tests each in which 4 of the tests are validation tests to determine whether the listeners are paying attention. Failure of a validation test invalidates all other tests. A total of 8095 answers from 211 human listeners were collected. Table 1 below presents the results of the evaluation.

TABLE 1

| Model | Mean Opinion Score |
|---|---|
| Clean | 4.39 ± 0.05 |
| Described Systems | 4.06 ± 0.06 |
| Conventional Systems | 3.01 ± 0.09 |
| No Enhancement | 2.85 ± 0.09 |

As shown in Table 1 above, the described systems for music enhancement achieved a highest mean opinion score. The mean opinion score for the described music enhancement systems is approximately 35 percent higher than a mean opinion score for the conventional systems for enhancing speech. Further, the mean opinion score for the described systems for music enhancement is near a mean opinion score for clean audio.

Example System and Device

Figure 6:
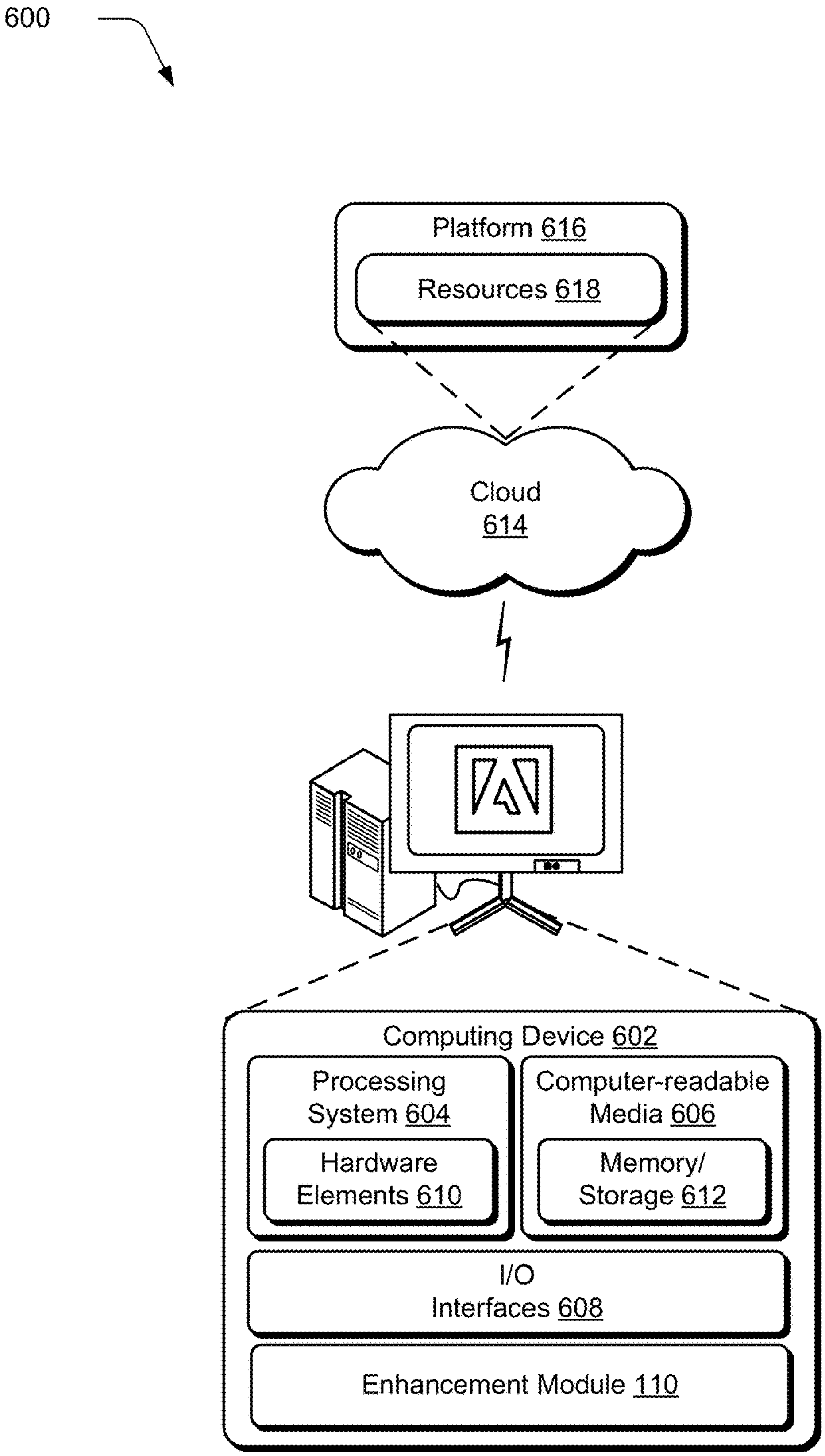
FIG. 6 illustrates an example system that includes an example computing device that is representative of one or more computing systems and/or devices for implementing the various techniques described herein.

FIG. 6 illustrates an example system 600 that includes an example computing device that is representative of one or more computing systems and/or devices that are usable to implement the various techniques described herein. This is illustrated through inclusion of the enhancement module 110. The computing device 602 includes, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that are configured as processors, functional blocks, and so forth. This includes example implementations in hardware as an application specific integrated circuit or other logic device formed using one or more semiconductors. The hardware elements 610 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 606 is illustrated as including memory/storage 612. The memory/storage 612 represents memory/storage capacity associated with one or more computer-readable media. In one example, the memory/storage 612 includes volatile media (such as random access memory (RAM)) and/or nonvolatile media (such as read only memory (ROM), Flash memory, optical disks, magnetic disks, and so forth). In another example, the memory/storage 612 includes fixed media (e.g., RAM, ROM, a fixed hard drive, and so on) as well as removable media (e.g., Flash memory, a removable hard drive, an optical disc, and so forth). The computer-readable media 606 is configurable in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 602. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 602, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 610. For example, the computing device 602 is configured to implement particular instructions and/or functions corresponding to the software and/or hardware modules. Accordingly, implementation of a module that is executable by the computing device 602 as software is achieved at least partially in hardware, e.g., through use of computer-readable storage media and/or hardware elements 610 of the processing system 604. The instructions and/or functions are executable/operable by one or more articles of manufacture (for example, one or more computing devices 602 and/or processing systems 604) to implement techniques, modules, and examples described herein.

The techniques described herein are supportable by various configurations of the computing device 602 and are not limited to the specific examples of the techniques described herein. This functionality is also implementable entirely or partially through use of a distributed system, such as over a "cloud" 614 as described below.

The cloud 614 includes and/or is representative of a platform 616 for resources 618. The platform 616 abstracts underlying functionality of hardware (e.g., servers) and software resources of the cloud 614. For example, the resources 618 include applications and/or data that are utilized while computer processing is executed on servers that are remote from the computing device 602. In some examples, the resources 618 also include services provided over the Internet and/or through a subscriber network, such as a cellular or Wi-Fi network.

The platform 616 abstracts the resources 618 and functions to connect the computing device 602 with other computing devices. In some examples, the platform 616 also serves to abstract scaling of resources to provide a corresponding level of scale to encountered demand for the resources that are implemented via the platform. Accordingly, in an interconnected device embodiment, implementation of functionality described herein is distributable throughout the system 600. For example, the functionality is implementable in part on the computing device 602 as well as via the platform 616 that abstracts the functionality of the cloud 614.

Conclusion

Although implementations of music enhancement systems have been described in language specific to structural features and/or methods, it is to be understood that the appended claims are not necessarily limited to the specific features or methods described. Rather, the specific features and methods are disclosed as example implementations of music enhancement systems, and other equivalent features and methods are intended to be within the scope of the appended claims. Further, various different examples are described and it is to be appreciated that each described example is implementable independently or in connection with one or more other described examples.

What is claimed is:

1. A method comprising:

receiving, by a computing device, input data describing a recorded acoustic waveform of a musical instrument;

representing, by the computing device, the recorded acoustic waveform of the musical instrument as an input mel spectrogram;

generating, by the computing device, an enhanced mel spectrogram by processing the input mel spectrogram using a first machine learning model, the first machine learning model including a conditional generative adversarial network trained on a first type of training data to generate enhanced mel spectrograms based on input mel spectrograms, the first type of training data including pairs of recorded acoustic waveforms and perturbed acoustic waveforms that are generated by modifying the recorded acoustic waveforms, the pairs of recorded acoustic waveforms being used to generate high-quality mel spectrograms and low quality spectrograms for training the first machine learning model to generate the enhanced mel spectrograms; and generating, by the computing device, an acoustic waveform of the musical instrument by processing the enhanced mel spectrogram using a second machine learning model trained to generate acoustic waveforms based on mel spectrograms, the second machine learning model is a denoising diffusion probabilistic model trained on a second type of training data, which is generated by iteratively adding Gaussian noise to the recorded acoustic waveforms used for generating the first type of training data, the second type of training data further including mel spectrograms computed for the recorded acoustic waveforms, the second machine learning model trained to estimate reverse transition distributions from adding the Gaussian noise to the recorded acoustic waveforms conditioned on the mel spectrograms computed for the recorded acoustic waveforms, the acoustic waveform of the musical instrument does not include an acoustic artifact that is included in the recorded acoustic waveform of the musical instrument.

2. The method as described in claim 1, wherein the acoustic artifact is noise, a reverberation, or a particular frequency energy.

3. The method as described in claim 1, further comprising filtering inaudible frequencies out from the recorded acoustic waveform of the musical instrument.

4. The method as described in claim 1, wherein the acoustic waveform of the musical instrument includes an additional acoustic artifact that is not included in the recorded acoustic waveform of the musical instrument.

5. The method as described in claim 1, wherein the perturbed acoustic waveforms are generated by convolving the recorded acoustic waveforms with a room impulse response.

6. The method as described in claim 1, wherein the perturbed acoustic waveforms are generated by applying additive background noise to the recorded acoustic waveforms or by applying multi-band equalization with randomly sampled gains to the recorded acoustic waveforms.

7. The method as described in claim 1, wherein the musical instrument includes a piano.

8. The method as described in claim 1, wherein the pairs of recorded acoustic waveforms and perturbed acoustic waveforms are generated by convolving the recorded acoustic waveforms with a room impulse response.

9. The method as described in claim 1, wherein the pairs of recorded acoustic waveforms and perturbed acoustic waveforms are generated by applying additive background noise to the recorded acoustic waveforms or by applying multi-band equalization with randomly sampled gains to the recorded acoustic waveforms.

10. A system comprising:

a mel spectrogram module implemented by one or more processing devices to:

receive input data describing a recorded acoustic waveform of a musical instrument; and represent the recorded acoustic waveform of the musical instrument as an input mel spectrogram;

a translation module implemented by the one or more processing devices to generate an enhanced mel spectrogram by processing the input mel spectrogram using a first machine learning model, the first machine learning model including a conditional generative adversarial network trained on a first type of training data to generate enhanced mel spectrograms based on input mel spectrograms, the first type of training data including pairs of recorded acoustic waveforms and perturbed acoustic waveforms that are generated by modifying the recorded acoustic waveforms, the pairs of recorded acoustic waveforms being used to generate high-quality mel spectrograms and low quality spectrograms for training the first machine learning model to generate the enhanced mel spectrograms; and a vocoding module implemented by the one or more processing devices to generate an acoustic waveform of the musical instrument using a second machine learning model trained to generate acoustic waveforms based on mel spectrograms, the second machine learning model is a denoising diffusion probabilistic model trained on a second type of training data, which is generated by iteratively adding Gaussian noise to the recorded acoustic waveforms used for generating the first type of training data, the second type of training data further including mel spectrograms computed for the recorded acoustic waveforms, the second machine learning model trained to estimate reverse transition distributions from adding the Gaussian noise to the recorded acoustic waveforms conditioned on the mel spectrograms computed for the recorded acoustic waveforms, the acoustic waveform of the musical instrument does not include an acoustic artifact that is included in the recorded acoustic waveform of the musical instrument.

11. The system as described in claim 10, wherein the acoustic artifact is noise, a reverberation, or a particular frequency energy.

12. The system as described in claim 10, wherein the musical instrument includes a piano.

13. The system as described in claim 10, wherein the pairs of recorded acoustic waveforms and perturbed acoustic waveforms are generated by convolving the recorded acoustic waveforms with a room impulse response.

14. A non-transitory computer-readable storage medium storing executable instructions, which when executed by a processing device, cause the processing device to perform operations comprising:

receiving input data describing a recorded acoustic waveform of a musical instrument that includes an acoustic artifact;

representing the recorded acoustic waveform of the musical instrument as an input mel spectrogram;

generating an enhanced mel spectrogram by processing the input mel spectrogram using a first machine learning model, the first machine learning model including a conditional generative adversarial network trained on a first type of training data to generate enhanced mel spectrograms based on input mel spectrograms, the first type of training data including pairs of recorded acoustic waveforms and perturbed acoustic waveforms that are generated by modifying the recorded acoustic waveforms, the pairs of recorded acoustic waveforms being used to generate a high-quality mel spectrograms and low quality spectrograms for training the first machine learning model to generate the enhanced mel spectrograms; and generate an acoustic waveform of the musical instrument that does not include the acoustic artifact by processing the enhanced mel spectrogram using a second machine learning model trained to generate acoustic waveforms based on mel spectrograms, the second machine learning model is a denoising diffusion probabilistic model trained on a second type of training data, which is generated by iteratively adding Gaussian noise to the recorded acoustic waveforms used for generating the first type of training data, the second type of training data further including mel spectrograms computed for the recorded acoustic waveforms, the second machine learning model trained to estimate reverse transition distributions from adding the Gaussian noise to the recorded acoustic waveforms conditioned on the mel spectrograms computed for the recorded acoustic waveforms.

15. The non-transitory computer-readable storage medium as described in claim 14, wherein the acoustic artifact is noise, a reverberation, or a particular frequency energy.

16. The non-transitory computer-readable storage medium as described in claim 14, wherein the acoustic waveform of the musical instrument includes an additional acoustic artifact that is not included in the recorded acoustic waveform of the musical instrument.

17. The non-transitory computer-readable storage medium as described in claim 14, wherein the operations further comprise filtering inaudible frequencies out from the recorded acoustic waveform of the musical instrument.

18. The non-transitory computer-readable storage medium as described in claim 14, wherein the pairs of recorded acoustic waveforms and perturbed acoustic waveforms are generated by convolving the recorded acoustic waveforms with a room impulse response.

19. The non-transitory computer-readable storage medium as described in claim 14, wherein the pairs of recorded acoustic waveforms and perturbed acoustic waveforms are generated by applying additive background noise to the recorded acoustic waveforms or by applying multiband equalization with randomly sampled gains to the recorded acoustic waveforms.

20. The non-transitory computer-readable storage medium as described in claim 14, wherein the musical instrument includes a piano.

* * * * *